US012779651B2

(12) United States Patent
Liu et al.

(10) Patent No.: US 12,779,651 B2
(45) Date of Patent: Nov. 3, 2026

(54) POWER TOOL SYSTEM AND BATTERY PACK THEREOF

(71) Applicant: Greenworks (Jiangsu) Co., Ltd., Changzhou (CN)

(72) Inventors: Chuanjun Liu, Changzhou (CN); Xinzhong Guo, Changzhou (CN); An Yan, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 18/416,963

(22) Filed: Jan. 19, 2024

(65) Prior Publication Data

US 2024/0149424 A1 May 9, 2024

Related U.S. Application Data

(63) Continuation of application No. 16/697,402, filed on Nov. 27, 2019, now abandoned.

(30) Foreign Application Priority Data

Nov. 27, 2018 (CN) ......................... 201811425584.1

(51) Int. Cl.
*B25F 5/00* (2006.01)
*H01M 10/04* (2006.01)
(Continued)

(52) U.S. Cl.
CPC ........... *B25F 5/00* (2013.01); *H01M 10/0445* (2013.01); *H01M 50/204* (2021.01);
(Continued)

(58) Field of Classification Search
None
See application file for complete search history.

(56) References Cited

U.S. PATENT DOCUMENTS 5,217,395 A 6/1993 Bailey et al.
7,397,219 B2 7/2008 Phillips et al.
(Continued)

FOREIGN PATENT DOCUMENTS

EP 3376558 A1 9/2018
EP 3534428 A1 9/2019
(Continued)

OTHER PUBLICATIONS

European Patent Office, Search Report and Written Opinion issued in related European Application No. 19211928.7, Mar. 30, 2020, 8 pages.
(Continued)

*Primary Examiner* — Matthew T Martin
*Assistant Examiner* — Ankith R Sripathi

(57) ABSTRACT

A power tool system and a battery pack. The battery pack includes a housing provided with a socket, and two battery cell groups received in the housing. Each battery cell group has a positive electrode and a negative electrode. The socket has four conductive terminals respectively and electrically connected to the electrodes of two battery cell groups. Two battery cell groups can be switched between isolated state and series connected state to output two different voltages through two conductive terminals with different polarities being disconnected or connected to each other, and the two conductive terminals with different polarities are respectively connected to two battery cell groups.

2 Claims, 10 Drawing Sheets

(51) Int. Cl.

| | |
|---|---|
| ***H01M 50/204*** | (2021.01) |
| ***H01M 50/247*** | (2021.01) |
| ***H01M 50/269*** | (2021.01) |
| ***H01M 50/296*** | (2021.01) |
| ***H01M 50/50*** | (2021.01) |
| ***H01M 50/503*** | (2021.01) |
| ***H01M 50/51*** | (2021.01) |
| ***H01M 50/512*** | (2021.01) |
| ***H02J 1/00*** | (2026.01) |
| ***H02J 1/082*** | (2026.01) |

(52) U.S. Cl.

CPC ....... *H01M 50/247* (2021.01); *H01M 50/269* (2021.01); *H01M 50/296* (2021.01); *H01M 50/50* (2021.01); *H01M 50/503* (2021.01); *H01M 50/51* (2021.01); *H01M 50/512* (2021.01); *H02J 1/00* (2013.01); *H01M 2220/30* (2013.01); *H02J 1/082* (2020.01)

(56) References Cited

U.S. PATENT DOCUMENTS

| | | | | |
|---|---|---|---|---|
| 9,583,745 | B2 | 2/2017 | White et al. | |
| 11,824,169 | B2 | 11/2023 | Nishikawa et al. | |
| 2011/0250484 | A1 | 10/2011 | Meng | |
| 2016/0020443 | A1 | 1/2016 | White et al. | |
| 2017/0072553 | A1 | 3/2017 | Bakker | |
| 2017/0170671 | A1* | 6/2017 | Mergener .............. | H02J 7/0048 |
| 2019/0259984 | A1 | 8/2019 | Nishikawa et al. | |
| 2020/0127339 | A1 | 4/2020 | Nakano et al. | |

FOREIGN PATENT DOCUMENTS

| | | | |
|---|---|---|---|
| EP | 3660949 | B1 | 6/2022 |
| WO | WO2015132606 | A1 | 9/2015 |
| WO | WO2015179318 | A1 | 11/2015 |
| WO | WO2018079722 | A1 | 5/2018 |
| WO | WO2018109488 | A1 | 6/2018 |

OTHER PUBLICATIONS

European Patent Office, Notice of Opposition in European Patent No. EP3660949, Mar. 1, 2023, 23 pages.

European Patent Office, Communication of a notice of opposition in EP Application No. 19211928.7, Mar. 7, 2023, 23 pages.

European Patent Office, Communication of notices of opposition in EP Application No. 19211928.7, Mar. 16, 2023, 2 pages.

European Patent Office, Submission in opposition proceedings in EP Application No. 19211928.7, Jul. 13, 2023, 28 pages.

European Patent Office, Brief Communication—Opposition proceedings in EP Application No. 19211928.7, Jul. 18, 2023, 16 pages.

European Patent Office, Preliminary opinion of the Opposition Division in EP Application No. 19211928.7, Nov. 3, 2023, 16 pages.

European Patent Office, Summons to attend oral proceedings pursuant to Rule 115(1) EPC (Bergenstrahle) in EP Application No. 19211928.7, Nov. 3, 2023, 22 pages.

European Patent Office, Summons to attend oral proceedings pursuant to Rule 115(1) EPC (Wood, Graham) in EP Application No. 19211928.7, Nov. 3, 2023, 22 pages.

European Patent Office, Letter accompanying subsequently filed items in EP Application No. 19211928.7, Nov. 6, 2023, 1 page.

* cited by examiner

POWER TOOL SYSTEM AND BATTERY PACK THEREOF

CROSS-REFERENCE TO RELATED APPLICATIONS

This application is a continuation of U.S. application Ser. No. 16/697,402, filed Nov. 27, 2019 (pending), which claims the priority of CN Application Serial No. 201811425584.1, filed on Nov. 27, 2018, the disclosures of which are hereby incorporated by reference in their entirety.

TECHNICAL FIELD

The present invention relates to a dual voltage battery pack and a power tool system.

BACKGROUND

Battery pack as a rechargeable power source is increasingly used for supplying power for outdoor tools, especially for cordless power tools. It's very convenience to use Lithium-ion batterie pack as an energy source to drive a motor of the power tool because the battery pack can be removed from the tools and rechargeable by an external charging device. Because the motor of the cordless power tool has a rated voltage and need to be driven by corresponding battery pack which can output the corresponding voltage, and different cordless power tools have different rated-voltage motors, so a plurality of battery packs which can supply different voltages for corresponding tools need to be carried when the worker operates different cordless power tools in the outdoors. It's very inconvenient for the operator because of the larger load caused by the battery packs.

Therefore, there is a requirement to provide an improved battery pack and a power tool system to overcome the problems described above.

SUMMARY OF INVENTION

The present invention provides a battery pack which can output two different voltages and a power tool system.

In order to achieve the object, the present invention provides a battery pack comprising a housing having a socket located thereon and two battery cell groups received in the housing, each battery cell group having a positive electrode and a negative electrode, the socket having a plurality of terminals received therein, the terminals including four conductive terminals respectively and electrically connected to corresponding electrode of two battery cell groups, two battery cell groups being switched between isolated state and series connected state to output two different voltages through two conductive terminals with different polarities being disconnected or connected to each other, and the two conductive terminals with different polarities being respectively connected to two battery cell groups.

In an exemplary embodiment, the two conductive terminals with different polarities are adjacent and separate to each other, and two battery cell groups are isolated with each other in the battery pack and output a low voltage.

In an exemplary embodiment, the two conductive terminals with different polarities are adjacent and connected to each other, and two battery cell groups are connected with each other in series in the battery pack and output a high voltage.

In an exemplary embodiment, four conductive terminals are arranged adjacent to each other, and the two conductive terminals with different polarities are located in the middle, and two adjacent conductive terminals located on two sides have same polarity.

In an exemplary embodiment, four conductive terminals are arranged adjacent to each other, and two conductive terminals with different polarities are located on one side of the four conductive terminals, and two adjacent conductive terminals which are located in the middle have same polarity.

In an exemplary embodiment, the two conductive terminals with different polarities each defines a contacting arm, and the contacting arms of the two conductive terminals with different polarities are close but separate to each other.

In an exemplary embodiment, two battery cell groups are switched from isolated state to series connected state to output a high voltage through changing the connection of two contacting arms from separate state to connected state.

In an exemplary embodiment, two battery cell groups are in series connected state and output a high voltage when the contacting arms of the two conductive terminals are connected to each other.

In an exemplary embodiment, the two conductive terminals with different polarities each defines a contacting arm, and the contacting arms of the two conductive terminals with different polarities are directly connected to each other through two contacting arms abutting with each other.

In an exemplary embodiment, two battery cell groups are switched from series connected state to isolated state to output a low voltage through changing the connection of two contacting arms from electrical connected state to electrical isolated state.

In an exemplary embodiment, two battery cell groups are in isolated state and output a low voltage when the contacting arms of the two conductive terminals are isolated from each other.

In an exemplary embodiment, the two conductive terminals with different polarities each further defines a pair of main arms located on one side of the contacting arm, and the main arms are in idle state when the contacting arms of the two conductive terminals abutting with each other.

The present invention also provides a power tool system comprising: a high rated-voltage power tool having a first male plug; a low rated-voltage power tool having a second male plug; and a battery pack supplying power to the high or low rated-voltage power tool connected thereto, the battery pack including a housing having a socket located thereon and two battery cell groups received in the housing, the socket defining a plurality of terminals received therein, the terminals including four conductive terminals, each battery cell group defining a positive electrode and a negative electrode respectively and electrically connected to corresponding conductive terminal, two battery cell groups being switched between isolated state and series connected state through two conductive terminals with different polarities being disconnected or connected to each other, and the two conductive terminals with different polarities being respectively connected to two battery cell groups, and the battery pack outputting a low voltage through connecting two battery cell groups in parallel when the second male plug being connected to the socket and a high voltage through connecting two battery cell groups in series when the first male plug being connected to the socket.

In an exemplary embodiment, two conductive terminals with different polarities are adjacent and separate to each other, and two battery cell groups are isolated with each other in the battery pack.

In an exemplary embodiment, the second male plug has four contacting terminals corresponding to four conductive terminals of the battery pack, and the four contacting terminals are respectively and electrically connected to corresponding four conductive terminals when two cell groups are connected with each other in parallel.

In an exemplary embodiment, the first male plug has one connecting terminal simultaneously and electrically connected with the two conductive terminals with different polarities and two conducting terminals respectively connected with corresponding conductive terminal of another two conductive terminals of the socket, and two battery cell groups are connected to each other in series through the connecting terminal simultaneously connecting one of the two conductive terminals with different polarities to the other of two conductive terminals with different polarities.

In an exemplary embodiment, the connecting terminal of the first male plug is simultaneously and electrically connected to the two conductive terminals with different polarities through two opposite sides thereof.

In an exemplary embodiment, the two conductive terminals with different polarities are adjacent and connected to each other, and two battery cell groups are connected with each other in series in the battery pack.

In an exemplary embodiment, the first male plug of the high rated-voltage power tool has two conducting terminals respectively and electrically connected to corresponding conductive terminals of the rest two conductive terminals in the four conductive terminals, and the conductive terminals with different polarities are disengaged when the first male plug is assembled to the socket.

In an exemplary embodiment, the second male plug of the low rated-voltage power tool has two contacting terminals and an insulating rib located in the middle of two contacting terminals, and each contacting terminal defines a pair of contacting arms branched at the end thereof for connecting with corresponding conductive terminal of the socket, and the insulating rib is inserted into the connected two conductive terminals of the socket to electrically isolate these two conductive terminals, and two cell groups are connected with each other in parallel when the insulating rib of the second male plug is clamped by the two conductive terminals with different polarities.

In an exemplary embodiment, four conductive terminals are arranged adjacent to each other, and the two conductive terminals with different polarities are located in the middle, and two adjacent conductive terminals located on two sides have same polarity.

In an exemplary embodiment, four conductive terminals are arranged adjacent to each other, and two conductive terminals with different polarities are located on one side of the four conductive terminals, and two adjacent conductive terminals which are located in the middle have same polarity.

In an exemplary embodiment, two conductive terminals with different polarities defines a gap formed therebetween, and the connecting terminal is inserted into the gap for simultaneously and electrically connecting the two conductive terminals with different polarities together.

In an exemplary embodiment, the second male plug has an insulating rib located in the middle of four contacting terminals, and the insulating rib is inserted into two conductive terminals in the middle to electrically isolated these two conductive terminals.

DESCRIPTION OF EMBODIMENTS

Figure 1:
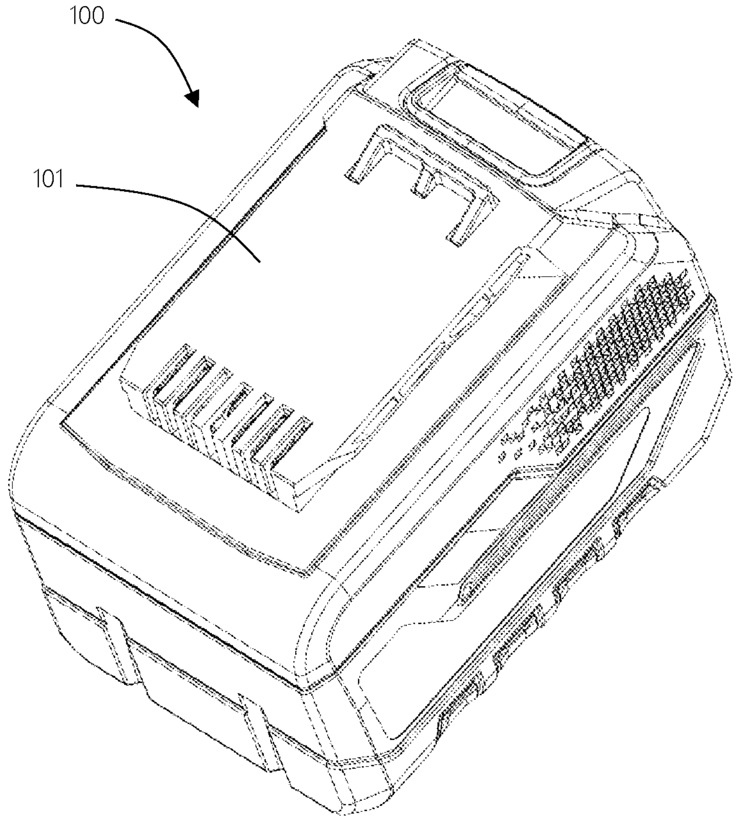
FIG. 1 is a perspective view of a battery pack in accordance with a first embodiment of the present invention.

The present invention will be described in detail below with reference to the drawings and specific embodiments.

It is also to be noted that, in order to avoid obscuring the invention in unnecessary detail, the structures and/or processing steps only closely related to the aspects of the present invention are shown in the drawings and the other details having little relationship with this invention is omitted.

In addition, it should be noted that the terms “comprising”, “including”, or any other variants are intended to encompass a non-exclusive inclusion, such that a process, method, article, or device that comprising a plurality of elements includes not only those elements but also the elements that are not explicitly listed, or the elements that are inherent to such a process, method, item, or device.

FIGS. 1 to 7 illustrate a power tool system according to a first embodiment of the present invention. The power tool system includes a high rated-voltage power tool (not shown) having a first male plug 120, a low rated-voltage power tool (not shown) having a second male plug 130, and a battery pack 100 optionally connected to the high or low rated-voltage power tools for supplying power to corresponding power tool. The battery pack 100 has a socket 110 located on the top thereof and optionally connected with the first male plug 120 or the second male plug 130. The battery pack 100 outputs a low voltage to the low rated-voltage power tool through the socket 110 electrically connecting with the second male plug 130 and a high voltage to the high rated-voltage power tool through the socket 110 electrically connecting with the first male plug 120.

Figure 2:
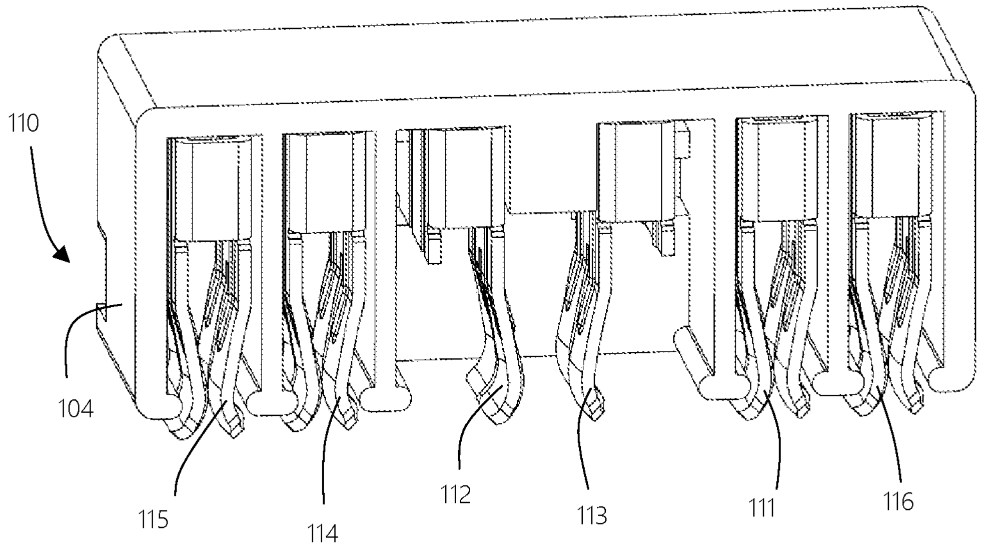
FIG. 2 is a perspective view of a socket of the battery pack shown in FIG. 1.
Figure 3:
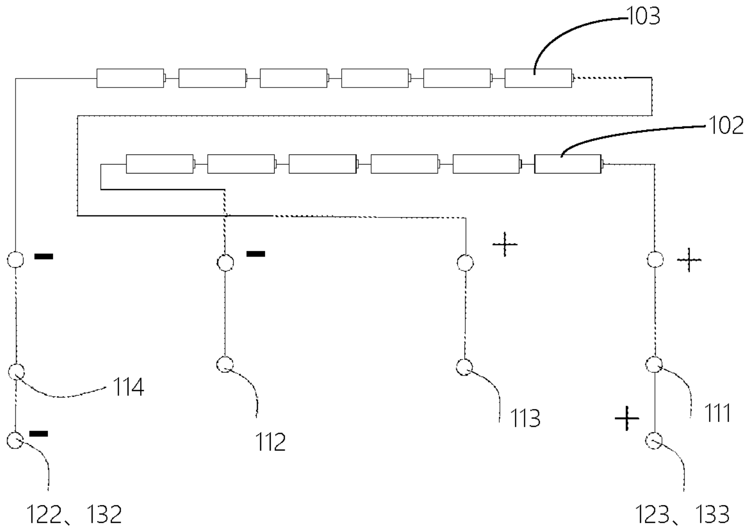
FIG. 3 is a schematic view of the electrical connection between the conductive terminals of the socket and the electrodes of two battery cell groups shown in FIG. 1.

Referring to FIG. 1 to FIG. 3, a battery pack 100 used for supplying power to corresponding power tool also includes a housing 101 and a first and second battery cell groups 102, 103 received in the housing 101. Each battery cell group 102, 103 has a plurality of battery cells connected in series and has same battery cells. Each battery cell group 102, 102 is electrically connected to the socket 110 through a circuit board (not shown) which is received in the housing 101. The two battery cell groups 102, 103 are connected with each other in parallel when the socket 110 is electrically connected with the second male plug 130. The two battery cell groups 102, 103 are connected with each other in series when the socket 110 is electrically connected with the first male plug 120.

Referring to FIG. 2, the socket 110 includes a body 104 formed on the top of the housing 101 and six terminals received in the body 104 in a row from left to right. Six terminals include one communicating terminal 115, four conductive terminals 114, 112, 113, 111 and one charging terminal 116. The communicating terminal 115 and the charging terminal 116 are respectively disposed at two opposite sides of all conductive terminals 114, 112, 113,111, so as to prevent the battery pack 100 from damage when charging at a high voltage level and prolong the service life of the battery pack 100. The charging terminal 116 is used for transferring charger to charge the battery cells of the battery cell groups 102, 103 when the battery pack 100 is connected to a power source through a charger (not shown).

The conductive terminals 111, 112, 113, 114 respectively connected to the positive and negative electrodes of two battery cell groups 102, 103 through a circuit board (not shown) are used to achieve the electrically connection between the battery pack 100 and the corresponding power tool when connected to the corresponding male plug 120, 130, so as to achieve the power supplying function of the battery pack 100 for the power tool. Two conductive terminals 111, 112 are respectively and electrically connected to the positive and negative electrodes of the first battery cell group 102. The other two conductive terminals 113, 114 are respectively connected to the positive and negative electrodes of the second battery cell group 103. Specifically, the conductive terminal 111 is electrically connected to the positive electrode of the first battery cell group 102. The conductive terminal 112 is electrically connected to the negative electrode of the first battery cell group 102. The conductive terminal 113 is electrically connected to the positive electrode of the second battery cell group 103. The conductive terminal 114 is electrically connected to the negative electrode of the second battery cell group 103.

Six terminals 111, 112, 113, 114, 115, 116 are configured with two different structures. The communicating terminal 115, the charging terminal 116 and two conductive terminals 111, 114 are configured with same structure. The rest two conductive terminals 112, 113 have same structure but different with that of the communicating terminal 115. Each of the communicating terminal 115, the charging terminal 116 and two conductive terminals 111, 114 has two contacting arms to clamp corresponding contacting terminal of the first or second male plug 120, 130. Two conductive terminals 112, 113 are symmetrically arranged in the middle of six terminals and each has one contacting arm for contacting with corresponding contacting terminal of the first or second male plug 120, 130.

Specifically, the conductive terminals 114, 112, 113, 111 are disposed in the body 104 from left to right. Two conductive terminals 111, 114 are respectively disposed at the opposite sides of two conductive terminals 112, 113.

Specifically, the conductive terminal 114 is disposed at the left side of the conductive terminal 112. The conductive terminal 111 is disposed at the right side of the conductive terminal 113. The conductive terminal 112 is disposed at the left side of the conductive terminal 113. Two conductive terminals 112, 113 are close to each other. The contacting arms of the conductive terminals 112, 113 are close but separate with each other. The first and second battery cell groups 102, 103 are isolated with each other in the battery pack 100.

Due to the layout of these four conductive terminals 114, 112, 113,111, the contacting arms of the conductive terminals 112, 113 are easily and mechanically connected or disconnected to each other. Therefore, the battery cell groups 102, 103 are easily switched between two states through the contacting arms of the conductive terminals 112, 113. One state is that two battery cell groups 102, 103 are connected with each other in series to output a high voltage. The other state is that two battery cell groups 102, 103 are connected with each other in parallel to output a low voltage.

Specifically, when the contacting arms of two conductive terminals 112, 113 are connected to each other, two battery cell groups 102, 103 are connected in series and the battery pack 100 can output a high voltage for the high rated-voltage power tool connected thereto. When the contacting arms of two conductive terminals 112, 113 are isolated or disconnected with each other, two battery cell groups 102, 103 are isolated with each other and the battery pack 100 can output a low voltage for the low rated-voltage power tool connected thereto.

In this embodiment, the conductive terminal 111 is the first positive terminal 111, the conductive terminal 112 is the first negative terminal 112, the conductive terminal 113 is the second positive terminal 113 and the conductive terminal 114 is the second negative terminal 114. The second negative terminal 114, the first negative terminal 112, the second positive terminal 113 and the first positive terminal 111 are disposed on the battery pack 100 from left to right. In this embodiment, the communicating terminal 115 is located at the left side of the second negative terminal 114 and the charging terminal 116 is located at the right side of the first positive terminal 111. The first negative terminal 112 and the second positive terminal 113 are selectively disconnected or connected in two different mechanical connection states. In one state, the two battery cell groups 102, 103 are connected with each other in series for outputting a high voltage. In another state, the two battery cell groups 102, 103 are connected with each other in parallel to output a low voltage.

Figure 4:
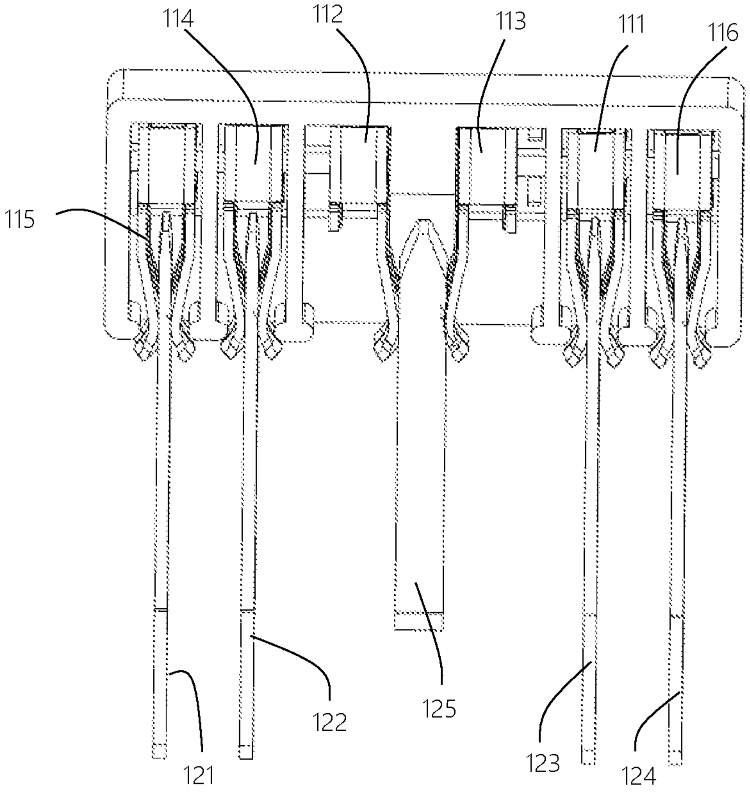
FIG. 4 is a partial perspective view of a power tool system according to the first embodiment of the present invention, showing the connection status of the socket of the battery pack in FIG. 2 and a first male plug of a high rated-voltage power tool when the battery pack outputting a high voltage for the high rated-voltage power tool, and the base of the first male plug is not shown.
Figure 5:
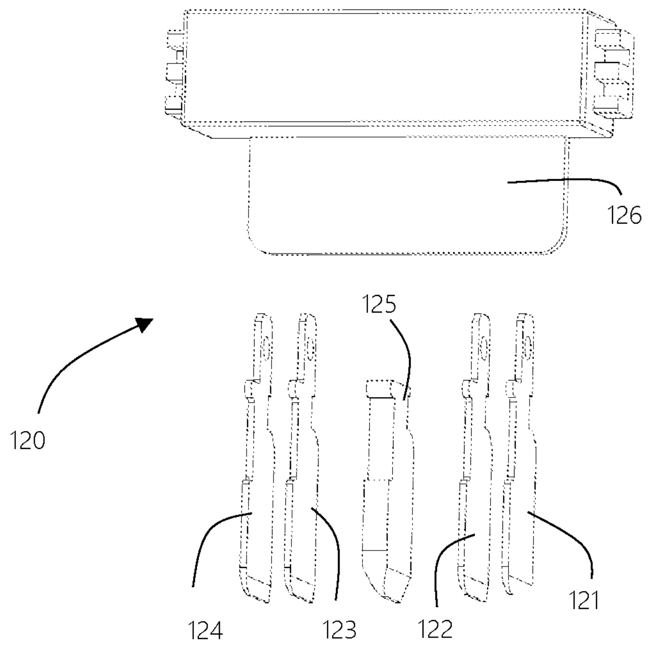
FIG. 5 is an exploded perspective view of the first male plug of the high rated-voltage power tool in accordance with the first embodiment of the present invention.

Referring to FIG. 4 and FIG. 5, the conductive terminals 114, 112,113,111 of the battery pack 100 cooperates with the first male plug 120 to output a high voltage for the high rated-voltage power tool (not shown). The first male plug 120 includes a stepped base 126 and a plurality of first male terminals 121, 122, 123, 124, 125 received in the stepped base 126. The first male terminals 121, 122, 123, 124, 125 include four first male conducting terminals 121, 122, 123, 124 and one connecting terminal 125 disposed in the same row and respectively connected to six terminals of the battery pack 100. The connecting terminal 125 is located at the middle of all the first male terminals 121, 122, 123, 124, 125 and can be connected with both conductive terminals 112, 113 when the first male plug 120 is inserted into the socket 110. The connecting terminal 125 has a width approximately same with the distance between the contacting arms of two conductive terminals 112, 113.

Four male conducting terminals 121, 122, 123, 124 are respectively connected to the communicating terminal 115, two conductive terminals 114, 111 and the charging terminal 116 through clamped by corresponding two arms of corresponding terminals of the socket 110 when the first male plug 120 is inserted into the socket 110. Specifically, when the first male plug 120 is inserted into the socket 110 of the battery pack 100, the male conducting terminal 121 is clamped by two contacting arms of the communicating terminal 115. The male conducting terminal 122 is clamped by two contacting arms of the conductive terminal 114. The male conducting terminal 123 is clamped by two contacting arms of the conductive terminal 111. The male conducting terminal 124 is clamped by two contacting arms of the charging terminal 116. The connecting terminal 125 is clamped together by the contacting arms of the conductive terminals 112, 113, so as to electrically connect the negative electrode of the first battery cell group 102 to the positive electrode of the second battery cell group 103. Therefore, the first and second battery cell groups 102, 103 are connected with each other in series and the battery pack 100 outputs a high voltage for the high rated voltage power tool through the negative conductive terminals 114 and the positive conductive terminal 111 thereof.

Specifically, when the first male plug 20 of the high rated-voltage power tool is connected to the socket 110 of the battery pack 100, only the electrical connections formed between the male conducting terminal 121 and the communicating terminal 115, the male conducting terminal 122 and the conducting terminal 114, the male conducting terminal 123 and the conducting terminal 111 are achieved between the first male plug 20 and the socket 110 of the battery pack 100. Specifically, the electrical connection formed between the male conducting terminal 122 and the conducting terminal 114 is used to transfer the communication between the battery pack 100 and the high rated-voltage power tool. The electrical connections formed between two sets of terminals, for example, the male conducting terminal 122 and the conducting terminal 114, the male conducting terminal 123 and the conducting terminal 111 are used to supply power from the battery pack 100 to the high rated-voltage power tool. The connecting terminal 125 is only used to electrically connected the conducting terminal 112 to the conducting terminal 113 in the battery pack 100, so as to make two battery cell groups 102, 103 connected with each other in series. No electrical connection between the battery pack 100 and the high rated-voltage power tool is achieved by the connecting terminal 125 and two conducting terminals 112, 113. The connecting terminal 125 is only used to achieve the electrical connection between two battery cell groups 102, 103.

The charging terminal 116 is used when the battery pack 100 is connected to an external power source for charging, and it doesn't work when the battery pack 100 is connected to the power tool, so that the charging terminal 116 and the male conducting terminal 124 only have a mechanical connection but not an electrical connection. The cooperation of the male conducting terminal 124 and the charging terminal 116 can enhance the mating strength between the first male plug 120 and the battery pack 100. Correspondingly, the first male plug 120 can be provided with only three first male terminals 121, 122, 123, and without the male conducting terminal 124.

Figure 6:
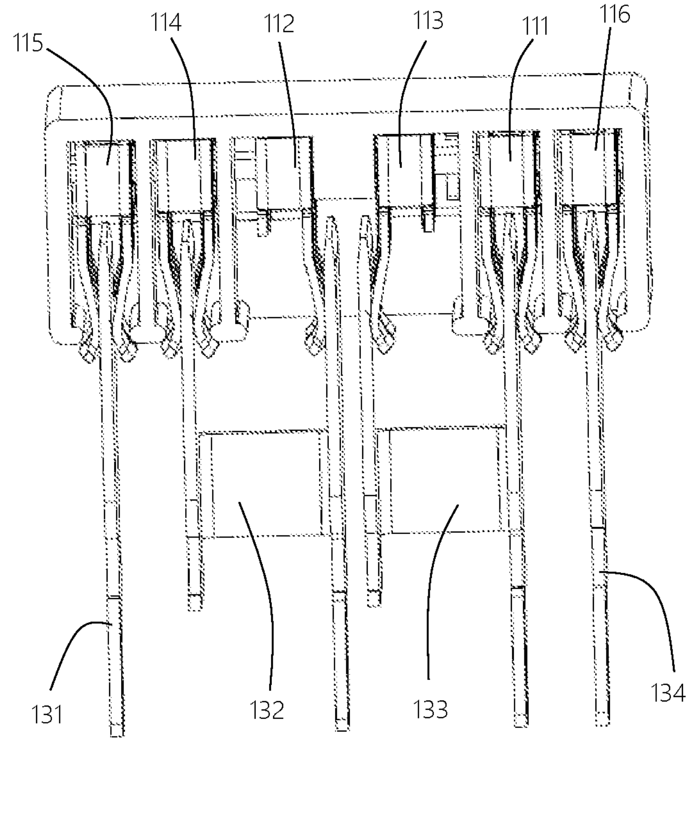
FIG. 6 is a partial perspective view of a power tool system according to the first embodiment of the present invention, showing the connection status of the socket of the battery pack and a second male plug of a low rated-voltage power tool when the battery pack outputting a low voltage for the low rated-voltage power tool, and the main housing of the second male plug is not shown.
Figure 7:
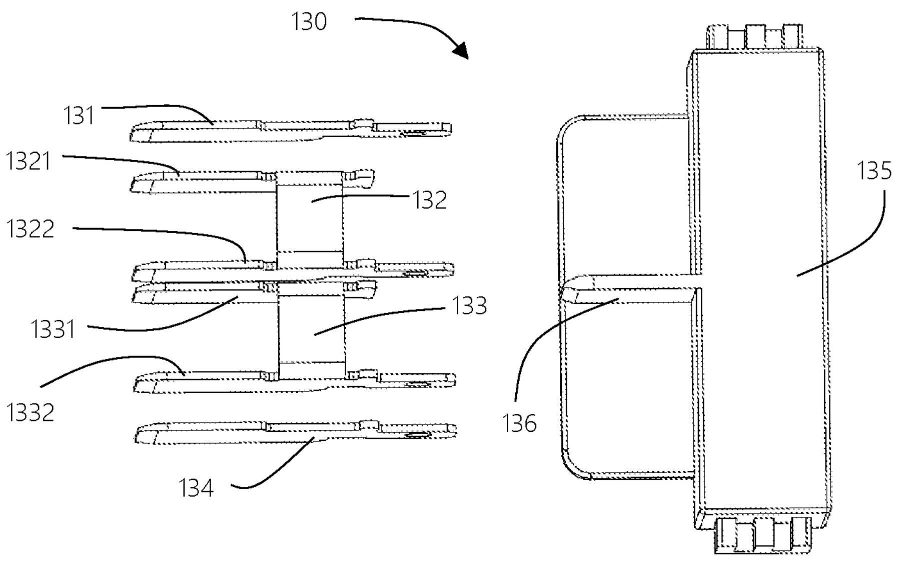
FIG. 7 is an exploded perspective view of the second male plug of the power tool in accordance with the first embodiment of the present invention.

Referring to FIG. 6 and FIG. 7, the conductive terminals 114, 112, 113, 111 of the battery pack 100 of the present invention cooperates with the second male plug 130 to output a low voltage for of a low rated-voltage power tool (not shown). The second male plug 130 includes a main housing 135 corresponding to the body 104 of the socket 110 and a plurality of second male terminals 131, 132, 133, 134 receiving in the main housing 135. The main housing 135 defines an insulating rib 136 at the bottom thereof, for electrically insulating two conductive terminals 112, 113 when the second male plug 130 is connected to the socket 110 of the battery pack 100. The insulating rib 136 extends along the main housing 135 from a rear-to-front direction. The insulating rib 136 integrally formed with the main housing 135 is located corresponding to the space formed between two conductive terminals 112, 113. The insulating rib 135 is also located in the middle of the second male terminals 131, 132, 133, 134. Specifically, the insulating rib 135 is located between two second male terminals 132, 133 for achieving the electrical insulation of two contacting terminals 132, 133 when the second mal plug 130 is connected to the socket 110 of the battery pack 100.

The second male terminals configured with two different type include four contacting terminals 131, 132, 133, 134 which are corresponding to six terminals of the battery pack 100. Four contacting terminals 131, 132, 133, 134 are disposed in the main housing 135 from left to right. Two contacting terminals 131, 134 have same structure and each defines only one contacting arm respectively clamped by two contacting arms of corresponding communicating terminal 115 or charging terminal 116. The function of the contacting terminals 131 is same with that of the conducting terminal 121 of the first mal plug 120 which is described above. The function of the contacting terminal 134 is same with that of the conducting terminal 124 of the first male plug 120 which is described above.

Two contacting terminals 132, 133 have same structure which is different with that of the contacting terminals 131, 134 and each defines a pair of contacting arms 1321, 1322, 1331, 1332 corresponding to conductive terminals 114, 112, 113, 111. Specifically, the contacting terminal 132 is configured with a pair of contacting arms 1321, 1322 branched at the end thereof. The contacting arm 1321 is clamped by two contacting arms of the conductive terminal 114 and the contacting arm 1322 is connected to the contacting arm of the conductive terminal 112. The contacting terminal 133 also defines two contacting arms 1331, 1332 branched at the end thereof. The contacting arm 1331 is electrically connected to the contacting arm of the conductive terminal 113 and the other contacting arm 1332 is clamped by two contacting arms of the conductive terminal 111. The contacting terminal 132 is simultaneously connected with two conductive terminals 114, 112 and the contacting terminal 133 is simultaneously connected with two conductive terminals 112, 111 when the second male plug 130 is connected to the socket 110.

Therefore, the electrical connection between the socket 110 and the second male plug 130 is achieved together by the contacting arms of the conductive terminal 114 clamping one contacting arm 1321 of the contacting terminal 132, the contacting arm of the conductive terminal 112 connecting with the other contacting arm 1322 of the contacting terminal 132, the contacting arm of the conductive terminal 113 contacting with one contacting arm 1331 of the contacting terminal 133 and the contacting arms of the conductive terminal 111 clamping the other contacting arm 1332 of the contacting terminal 133. Due to the structures of two contacting terminals 132, 133 of the second male plug 130 and the conductive terminals 114, 112, 113, 111 of the socket 110, the first battery cell group 102 and the second battery cell group 103 are connected with each other in parallel, the battery pack 100 output a low voltage to the low rated-voltage power tool through the electrical connections between the conducting terminals 114, 112,113, 111 of the socket 110 and two contacting terminals 132, 133 of the second male plug 130.

Specifically, the contacting arm 1322 of the contacting terminal 132 is closed to the contacting arm 1331 of the contacting terminal 133. The insulating rib 136 is located between the contacting arm 1322 of the contacting terminal 132 and the contacting arm 1331 of the contacting terminal 133 and separate these two contacting terminals 132 and 133, so as to prevent the contacting terminals 132, 133 from circuit shorting. The insulating rib 136 has a length longer than that of the contacting arms 1322, 1331.

In this embodiment, two conductive terminals 112, 113 are isolated with each other in the battery pack 100, so that two battery cell groups 102, 103 are isolated with each other. When the first male plug 120 of the high rated-voltage power tool is assembled on the socket 110 of the battery pack 100, the connecting terminal 125 of the first male plug 120 is clamped by corresponding contacting arms of two conductive terminals 112, 113, the conducting terminal 122 of the first male plug 120 is clamped by two contacting arms of the conductive terminal 114, and the conducting terminal 123 is clamped by two contacting arms of the conductive terminal 111, so that the conductive terminals 114, 112, 113, 111 are connected with each other in series, two battery cell groups 102, 103 of the battery pack 100 are connected with each other in series, therefore, the battery pack 100 outputs a high rated-voltage for the high rated-voltage power tool through the connection between the socket 100 and the first male plug 120. The battery cell groups 102. 103 can be switched between isolated state and series connection state when disconnecting or connecting the socket 110 of the battery pack 100 to the first male plug 120 of the high rate-voltage power tool. When the second male plug 130 of the low rated-voltage power tool is assembled on the socket 110 of the battery pack 100, the contacting terminal 133 of the second male plug 130 is simultaneously connected with two conductive terminals 111, 113, the contacting terminal 132 is simultaneously connected with two conductive terminals 112 and 114, so that two conductive terminals 111, 113 are connected in parallel and two conductive terminals 112, 114 are connected in parallel. Therefore, two battery cell groups 102, 103 are connected with each other in parallel and the battery pack 100 outputs a low voltage for the low rated-voltage power tool. The battery cell groups 102, 103 can be switched between isolated state and parallel connection state when disconnecting or connecting the socket 110 of the battery pack 100 to the second male plug 130 of the low rated-voltage power tool.

FIGS. 8 to 12 illustrate a power tool system in accordance with the second embodiment of the present invention. The power tool system includes a battery pack 200 with a socket 210, a high rated-voltage power tool with a first male plug 230 and a low rated-voltage power tool with a second male plug 220 in accordance with the second embodiment of the present invention. The differences between the power tool systems in the first and second embodiments are that the first male plug 230 of the high rated-voltage power tool in the second embodiment is configured as same with the second male plug 130 of the low rated-voltage power tool in the first embodiment and the second male plug 220 of the low rated-voltage power tool in the second embodiment is configured as same with the first male plug 120 of the high rated-voltage power tool in the first embodiment except lacking the connecting terminal 125. Two battery cell groups 202, 203 in the second embodiment are connected with each other in series when four conductive terminals 211, 212, 213, 214 are respectively and electrically connected to the corresponding positive and negative electrodes of the first and second battery cell group 202, 203, but two battery cell groups 102, 103 in the first embodiment are isolated with each other when four conductive terminals 111, 112, 113, 114 are respectively and electrically connected to the corresponding positive and negative electrodes of the first and second battery cell group 102, 103. The communicating terminal 215, the charging terminal 216 and two conductive terminals 214, 211 in the second embodiment are configured as same with corresponding communicating terminal 115, the charging terminal 116 and two conductive terminals 114, 111 in the first embodiment. The reason caused the different battery packs 200, 100 in different embodiments is the different structures of the sockets 210, 110. Specifically, the conductive terminals 212, 213 are respectively different with corresponding conductive terminals 112, 113. Each conductive terminal 212, 213 formed integrally from a conductive sheet defines a pair of main contacting arms 2121, 2131 and an auxiliary contacting arm 2122, 2132. But conductive terminal 112, 113 in the first embodiment each only has one contacting arm. The main contacting arms 2121, 2131 have same structure with that of the conductive terminals 215, 214, 211, 216. Two auxiliary contacting arms 2122, 212 are located close to each other and electrically connected with each other, so as to make two battery cell groups 202, 203 in the second embodiment being connected with each other in series in the battery pack 200.

Figure 8:
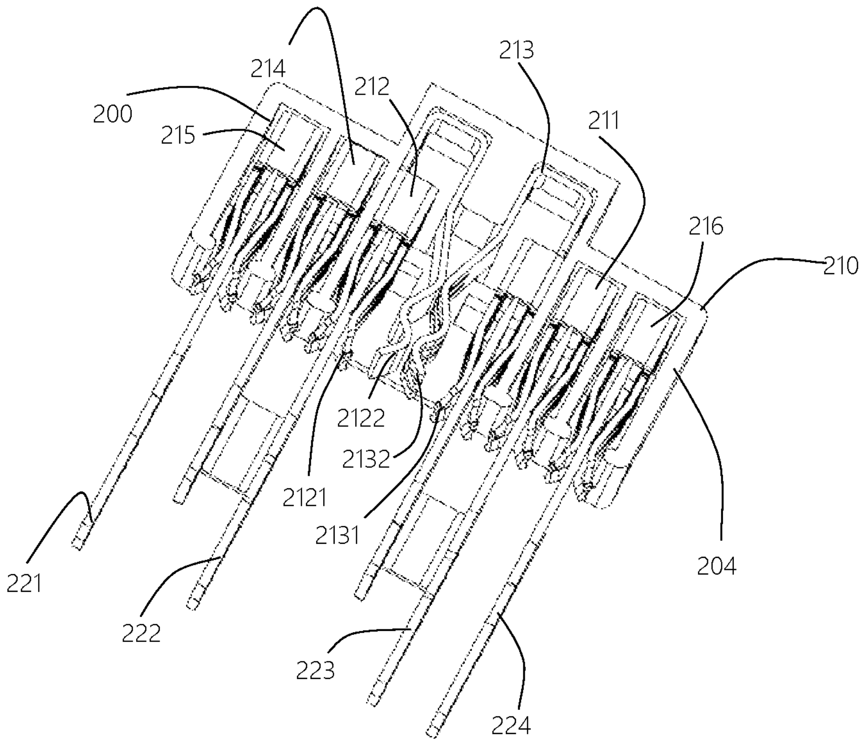
FIG. 8 is a partial perspective view of a power tool system according to the second embodiment of the present invention, showing the connection status of the socket of the battery pack and a second male plug of a low rated-voltage power tool when the battery pack outputting a low voltage for the low rated-voltage power tool, and the main housing of the second male plug is not shown.
Figure 9:
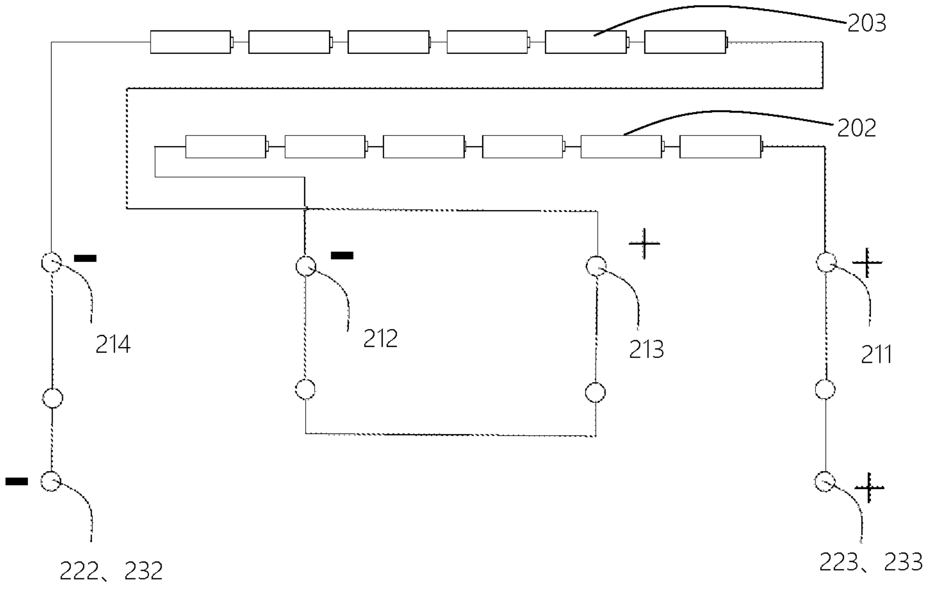
FIG. 9 is a schematic view of the electrical connection between the conductive terminals of the socket and the electrodes of two battery cell groups shown in FIG. 8.
Figure 10:
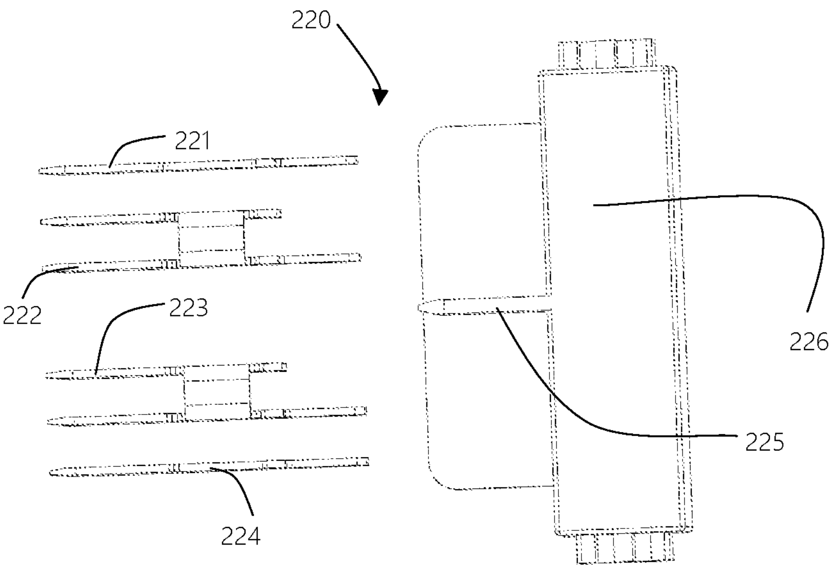
FIG. 10 is an exploded perspective view of the second male plug of the low rated-voltage power tool in accordance with the second embodiment of the present invention.

Referring to FIGS. 8 and 10, when the second male plug 220 of the low rated-voltage power tool is assembled to the socket 210 in the second embodiment, the contacting terminal 221 is clamped by two contacting arms of the communicating terminal 215, one contacting arm of the contacting terminal 222 is clamped by a pair of contacting arms of the conductive terminal 214, the other contacting arm of the contacting terminal 222 is clamped by two main contacting arms of the conductive terminal 212, the insulating rib 225 is clamped by two auxiliary contacting arms 2122, 2132, one contacting arm of the contacting terminal 223 is clamped by two main contacting arms of the conductive terminal 213 and the other contacting arm of the contacting terminal 223 is clamped by two contacting arms of the conductive terminal 211, and the contacting terminal 224 is clamped by two contacting arms of the charging terminal 216. The insulating rib 225 is separate the auxiliary contacting arm 2122 of the conductive terminal 212 from the auxiliary contacting arm 2132 of the conductive terminal 213, so that the contacting terminal 222 of the second male plug 220 is simultaneously connected with two conductive terminals 214, 212 of the socket 210, the contacting terminal 223 of the second male plug 220 is simultaneously connected with two conductive terminals 213, 211. Therefore, two battery cell groups 202, 203 are connected with each other in parallel due to two conductive terminals 214, 212 being connected with each other in parallel and two conductive terminals 213, 211 being connected with each other in parallel. And then the battery pack 200 outputs a low voltage to the low rated-voltage power tool through the socket 210 and the second male plug 220. Two battery cell groups 202, 203 can be switched between series connection state and parallel connection state through disconnecting or connecting the socket 210 of the battery pack 200 to the second male plug 220 of the low rated-voltage power tool.

Figure 11:
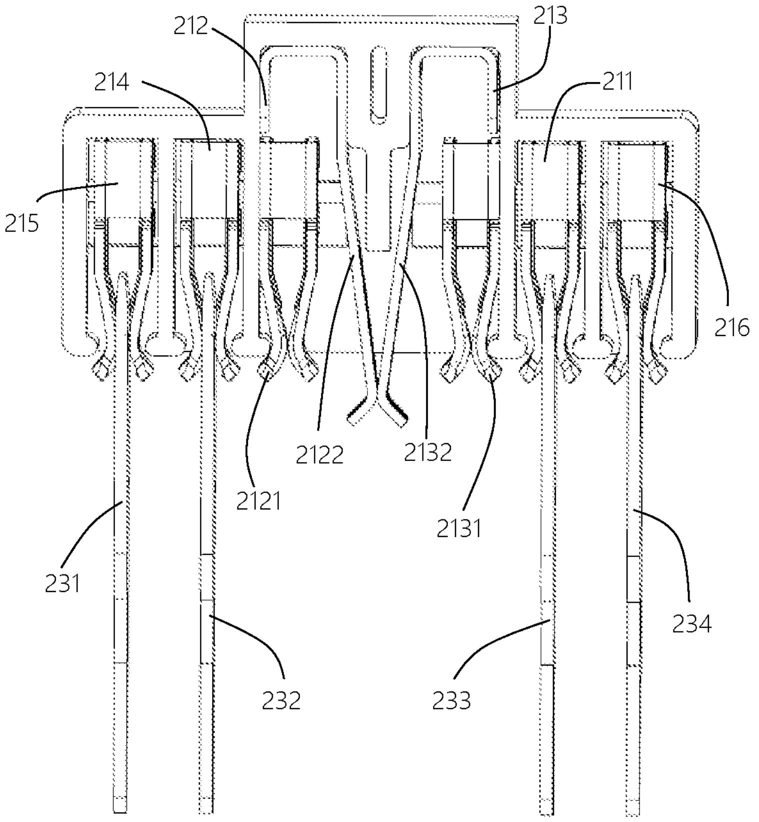
FIG. 11 is a partial perspective view of a power tool system according to the second embodiment of the present invention, showing the connection status of the socket of the battery pack and a first male plug of a high rated-voltage power tool when the battery pack outputting a high voltage for the high rated-voltage power tool, and the base of the first male plug is not shown.
Figure 12:
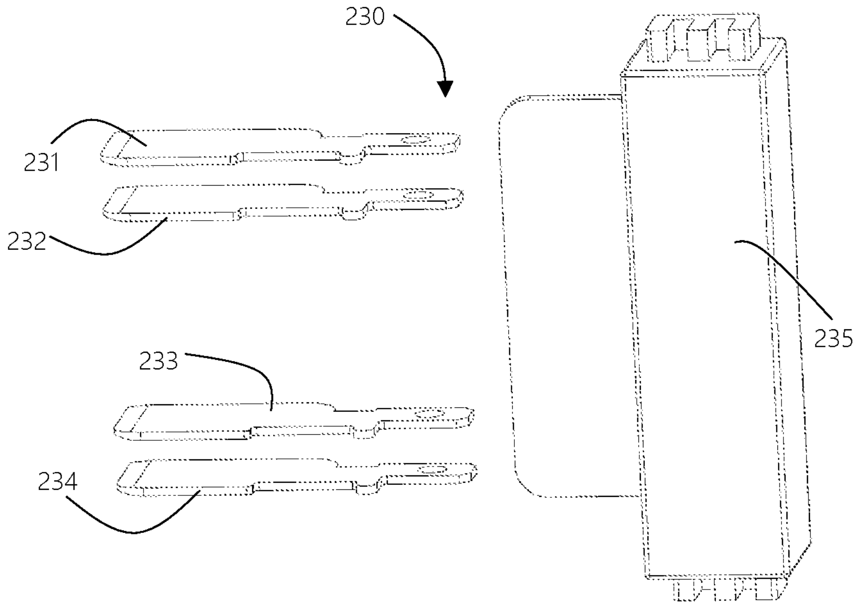
FIG. 12 is an exploded perspective view of the first male plug of the high rated-voltage power tool shown in FIG. 11 according to the second embodiment of the present invention.
Figure 13:
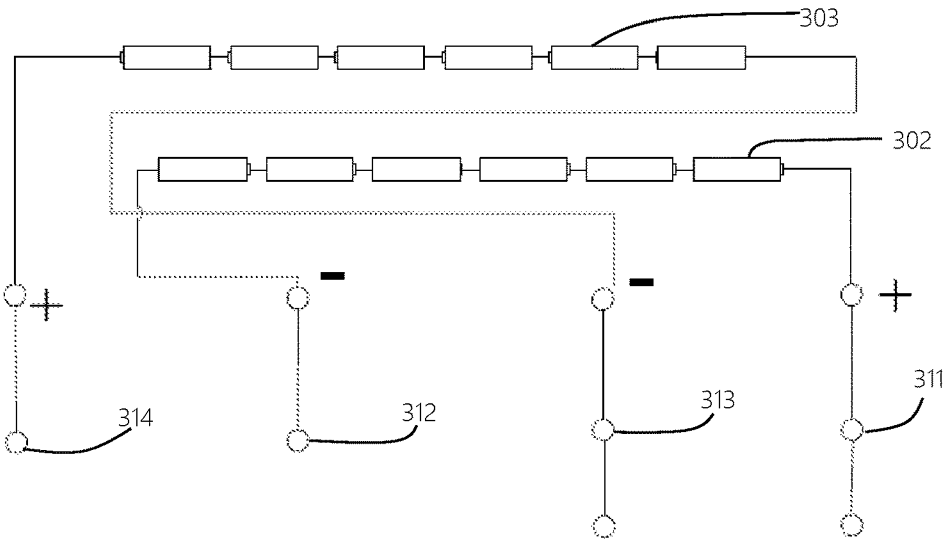
FIG. 13 is a schematic view of the electrical connection between the conductive terminals of the socket and the electrodes of two battery cell groups of the battery pack according to the third embodiment of the present invention.

Referring to FIGS. 11 and 12, when the first male plug 230 of the high rated-voltage power tool is assembled to the socket 210 of the battery pack 200 in the second embodiment, the conducting terminal 231 is clamped by two contacting arms of the communicating terminal 215, the conducting terminal 232 is clamped by two contacting arms of the conductive terminal 214, the conducting terminal 233 is clamped by two contacting arms of the conductive terminal 211, the conducting terminal 234 is clamped by two contacting arms of the charging terminal 216. The main contacting arms 2121, 2131 of the conductive terminals 212, 213 are disengaged but the auxiliary contacting arm 2122 of the conductive terminal 212 is connected to the auxiliary contacting arm 2132 of the conductive terminal 213. So that two battery cell groups 202, 203 are connected with each other in series, the battery pack 200 outputs a high voltage for a high rated-voltage power tool through the socket 210 and the first male plug 230.

In the second embodiment, two conductive terminals 212, 213 are connected with each other in the battery pack 200, so that two battery cell groups 202, 203 are connected with each other in series in the battery pack 200. When the first male plug 230 of the high rated-voltage power tool is assembled on the socket 210 of the battery pack 200, the conducting terminal 232 is clamped by two contacting arms of the conductive terminal 214, the conducting terminal 233 is clamped by two contacting arms of the conductive terminal 211, so that the conductive terminals 214, 212, 213, 211 are connected to each other in series through the conductive terminal 212 being connected with the conductive terminal 213, two battery cell group 202, 203 are connected with each other in series. Therefore, the battery pack 200 outputs a high voltage for the high rated-voltage power tool through the connection between the socket 210 and the first male plug 230. When the second male plug 220 of the low rated-voltage power tool is assembled on the socket 210 of the battery pack 200, the contacting terminal 222 is simultaneously connected with two conductive terminals 214, 212, and the contacting terminal 223 is simultaneously connected with two conductive terminals 213, 211, and the insulating rib 225 is simultaneously connected with two auxiliary arms 2122, 2131 and separated the connection between two conductive terminals 212, 213. So that the conductive terminals 214, 213, 212, 211 are connected with each other in parallel through the contacting terminals 222, 223. Therefore, two battery cell groups 202, 203 are connected with each other in parallel and the battery pack 200 outputs a low voltage for the low rated-voltage power tool. Two battery cell groups 202, 203 can be switched between series connection state and parallel connection state when disconnecting or connecting the socket 210 of the battery pack 200 to the second male plug 220 of the low rated-voltage power tool.

FIGS. 13 to 16 illustrate a power tool system in accordance with the third embodiment of the present invention. The power tool system includes a battery pack 300 provided with a socket 310, a high rated-voltage power tool provided with a first male plug 330 and a low rated-voltage power tool with a second male plug 320 in the third embodiment of the present invention. The socket 310 of the battery pack 300 in this embodiment has same structure with the socket 110 of the battery pack 100 in the first embodiment, except that the conductive terminal 313 is connected to the negative electrode of the second battery cell group 303, and the conductive terminal 314 is connected to the positive electrode of the second battery cell group 303. But in the first embodiment, the conductive terminal 113 is connected to the positive electrode of the second battery cell group 103 and the conductive terminal 314 is connected to the negative electrode of the second battery cell group 103. Two battery cell groups 203, 303 are isolated with each other in the battery pack 300 before the battery pack 300 is connected to the high or low rated-voltage power tools. Two battery cell groups 302, 303 can be switched between isolated state and parallel connected state through disconnecting or connecting the socket 310 of the battery pack 300 to the second male plug 320 of the low rated-voltage power tool. Two battery cell group 302, 303 can be also switched between isolated state and series connected state through disconnecting or connecting the socket 310 of the battery pack 300 to the first male plug 330 of the high rated-voltage power tool.

The second male plug 320 of the low rated-voltage power tool in the third embodiment has similar structure with the first male plug 120 of the high rated-voltage power tool in the first embodiment, except that the contacting terminal 322 of the second male plug 320 in the third embodiment is formed as a whole by integrating tow conductive terminals 122, 123 of the first male plug 120 in the first embodiment. Therefore, when the second male plug 320 of the low rated-voltage power tool (not shown) is connected to the socket 310 of the battery pack 300 in the third embodiment, the contacting terminal 322 is simultaneously connected with two conductive terminals 314, 313 at the same time through two contacting arms of the conductive terminal 314 clamping one contacting arm of the contacting terminal 322 and two contacting arms of the conductive terminal 311 clamping the other contacting arm of the contacting terminal 322. So that two positive electrodes of two battery cell groups 302, 302 are connected with each other in parallel. The connecting terminal 323 of the second male plug 320 is simultaneously connected with two conductive terminals 312, 313. So that two positive electrodes of two battery cell groups 302, 302 are connected with each other in parallel. Such that two battery cell groups 302, 302 are connected with each other in parallel when the second male plug 320 of the low rated-voltage power tool is assembled on the socket 310 of the battery pack 300. And the battery pack 300 can output a low voltage for the low rated-voltage power tool through connecting the socket 310 to the second male plug 320. Two battery cell groups 302, 302 can be switched between isolated state and parallel state through disconnecting or connecting the battery pack 300 to the low rated-voltage power tool. The contacting terminal 321 is clamped by two contacting arms of the communicating terminal 315. The contacting terminal 324 is clamped by two contacting arms of the charging terminal 316, referring to FIG. 14.

Figure 16:
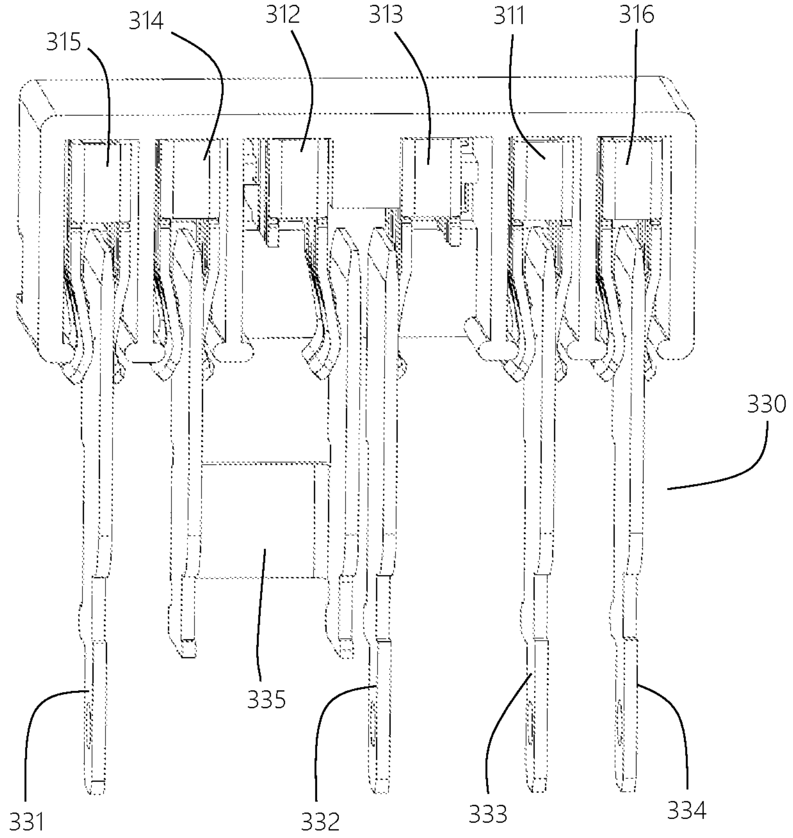
FIG. 16 is a partial perspective view of a power tool system according to the third embodiment of the present invention, showing the connection status of the conductive terminals of the battery pack and a first male plug of a high rated-voltage power tool when the battery pack outputting a high voltage for the high rated-voltage power tool, and the base of the first male plug is not shown.
Figure 17:
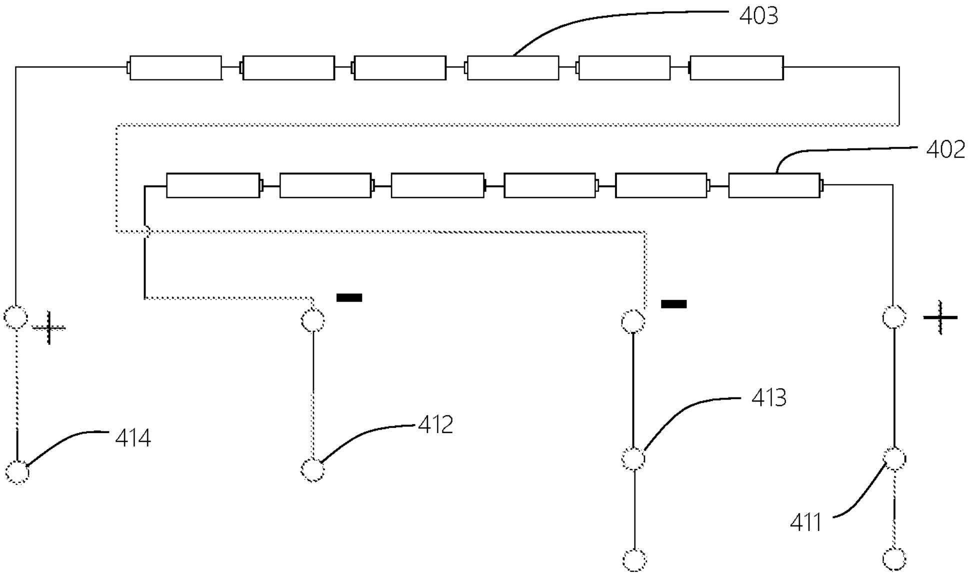
FIG. 17 is a schematic view of the electronical connection between the conductive terminals of the socket and the electrodes of two battery cell groups of the battery pack according to the fourth embodiment of the present invention.
Figure 18:
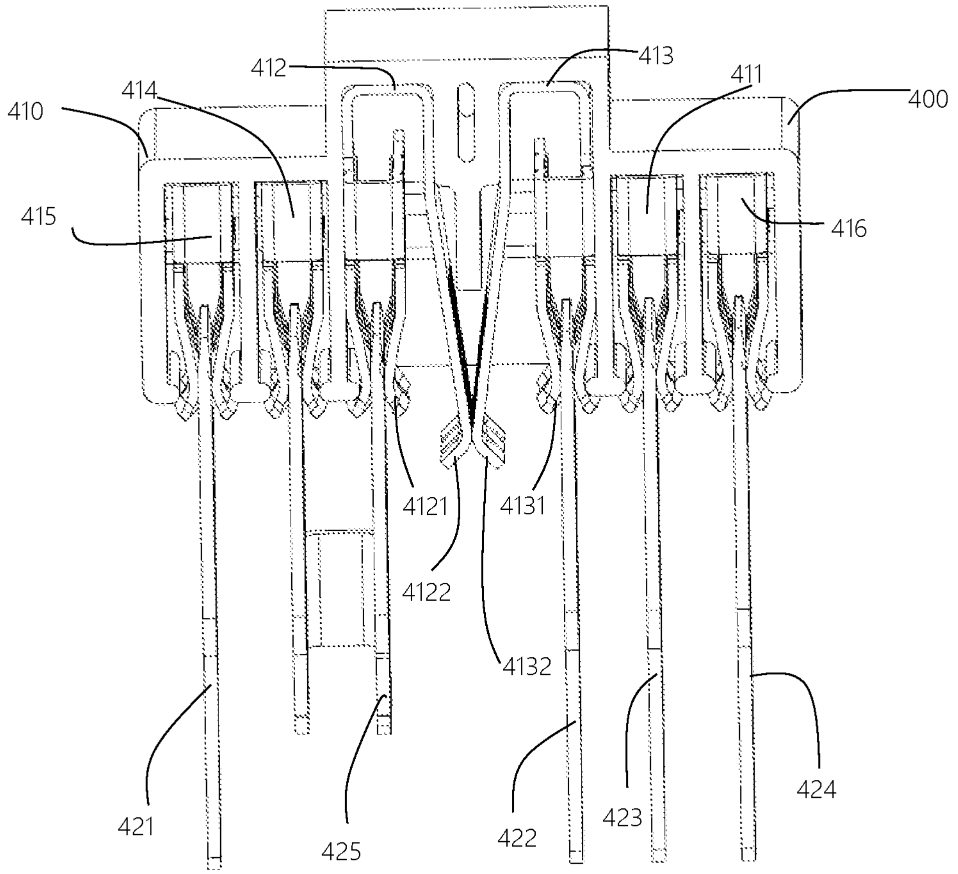
FIG. 18 is a partial perspective view of a power tool system according to the fourth embodiment of the present invention, showing the connection status of the conductive terminals of the battery and a first male plug of the high rated-voltage power tool when the battery pack outputting high voltage for the high rated-voltage power tool, and the base of the first male plug is not shown.

Referring to FIG. 16, the first male plug 330 of the high rated-voltage power tool in the third embodiment has similar structure with the second male plug 130 of the low rated-voltage power tool in the first embodiment, except that two conducting terminals 332, 333 are isolated and separated with each other. When the first male plug 330 is assembled to the socket 310 of the battery pack 300, the conducting terminal 331 is clamped by two contacting arms of the communicating terminal 315, the connecting terminal 335 is simultaneously connected with two conductive terminals 314, 312, the conducting terminal 332 is contacting with the contacting arm of the conductive terminal 313, the conducting terminal 333 is clamped by two contacting arms of the conductive terminal 311, and the conducting terminal 334 is clamped by two contacting arms of the charging terminal 316. So that two battery cell groups 302, 303 are connected with each other in series due to the conductive terminal 314 connected to the connective terminal 312 through the connecting terminal 335 of the first male plug 330 and the battery pack 300 output a high voltage to the high rated-voltage power tool through the connection between the socket 310 and the first male plug 330. Two battery cell groups 302, 303 can be switched between isolated state and series connected state through disconnecting or connecting the socket 310 of the battery pack 300 to the first male plug 330 of the high rated-voltage power tool.

FIGS. 17 to 20 illustrate a power tool system in accordance with the fourth embodiment of the present invention. the power tool system according to the fourth embodiment incudes a battery pack 400 with a socket 410, a high rated-voltage power tool with a first male plug 420 and a low rated-voltage power tool with a second male plug 430. The battery pack 400 in the fourth embodiment has similar structure with the battery pack 200 in the second embodiment and shown in FIG. 11, except that the conductive terminal 414 is electrically connected to the positive electrode of the second battery cell group 403 and the conductive terminal 413 is electrically connected to the negative electrode of the second battery cell group 403. While the conductive terminal 214 is electrically connected to the negative electrode of the second battery cell group 203 and the conductive terminal 213 is electrically connected to the positive electrode of the second battery cell group 203 in the second embodiment. So that the negative electrodes of two battery cell groups 402, 403 are connected with each other through the auxiliary contacting arm 4122 of the conductive terminal 412 contacting the auxiliary contacting arm 4132 of the conductive terminal 413.

Figure 19:
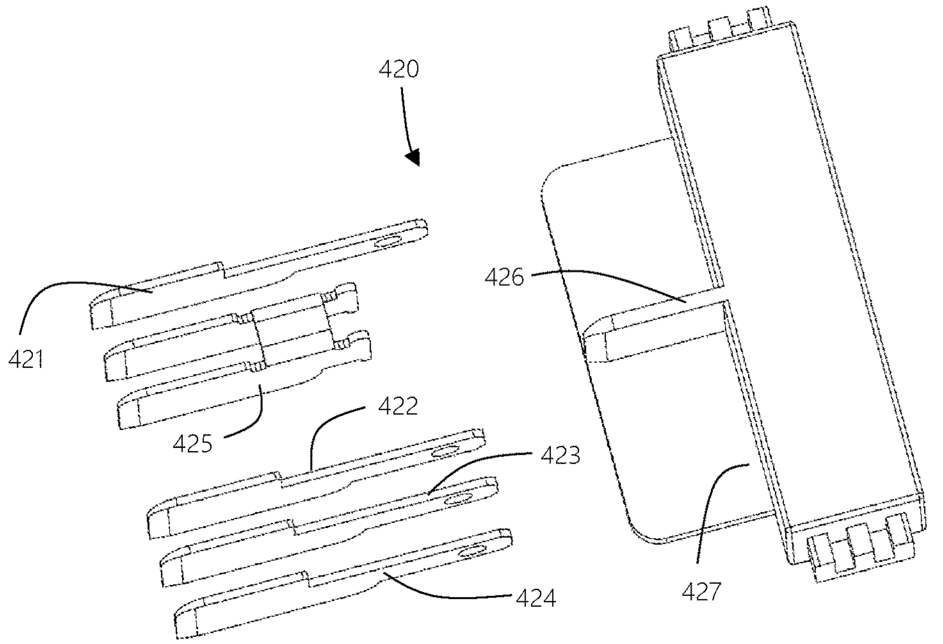
FIG. 19 is an exploded perspective view of the f male plug of the high rated-voltage power tool according to the fourth embodiment of the present invention.

Referring FIG. 19, the first male plug 420 of the high rated-voltage power tool in this embodiment is configured as same structure with that of the second male plug 220 of the low rated-voltage power tool shown in FIG. 10 in the second embodiment, except two conducting terminals 422, 423 are isolated and separated with each other, while the contacting arm 223 in the second embodiment is integrated together as a whole. When the first male plug 420 of the high rated-voltage power tool is assembled to the socket 410 of the battery pack 400, the conducting terminal 421 is clamped by two contacting arms of the communicating terminal 415, the connecting terminal 425 is simultaneously connected with two conductive terminals 414, 412 through one contacting arm thereof being clamped by two contacting arms of the conductive terminal 414 and the other contacting arm thereof being clamped by two main contacting arms 4121 of the conductive terminal 412. The insulating rib 416 is simultaneously contacted with the auxiliary arm 4122 of the conductive terminal 412 and the auxiliary arm 4132 of the conductive terminal 413. The conducting terminal 422 is clamped by two main contacting arms 4131 of the conductive terminal 413. The conducting terminal 423 is clamped by two contacting arms of the conductive terminal 411 and the conducting terminal 424 is clamped by two contacting arms of the charging terminal 416. Therefore, two battery cell groups 402, 403 are connected with each other in series through the connecting terminal 425 connecting the conductive terminal 414 to the conductive terminal 412 and the insulating rib 426 electrically insulating two conductive terminals 412 and 413. The battery pack 400 output a high voltage to the high rated-voltage power tool through the socket 410 is connected to the first male plug 420.

Figure 14:
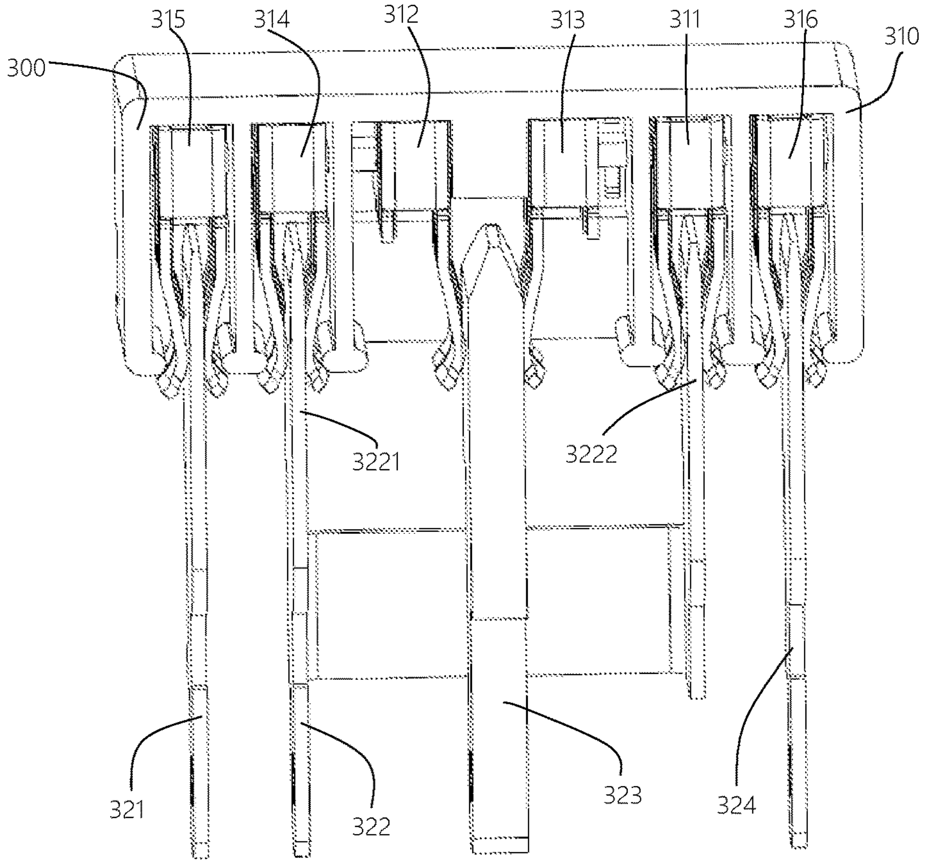
FIG. 14 is a partial perspective view of a power tool system according to the third embodiment of the present invention, showing the connection status of the socket of the battery pack and a second male plug of a low rated-voltage power tool when the battery pack outputting a low voltage for the low rated-voltage power tool, and the main housing of the second male plug is not shown.
Figure 15:
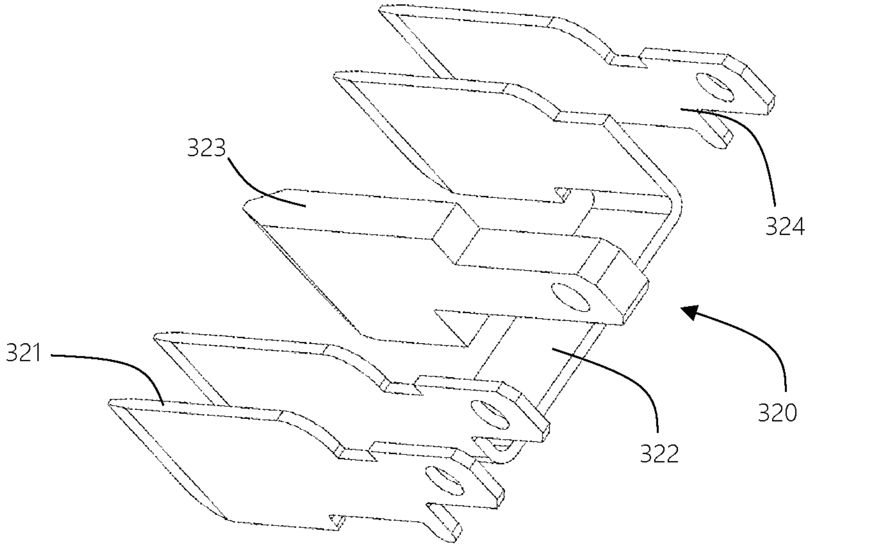
FIG. 15 is a partially exploded perspective view of the second male plug of the low rated-voltage power tool shown in FIG. 14.
Figure 20:
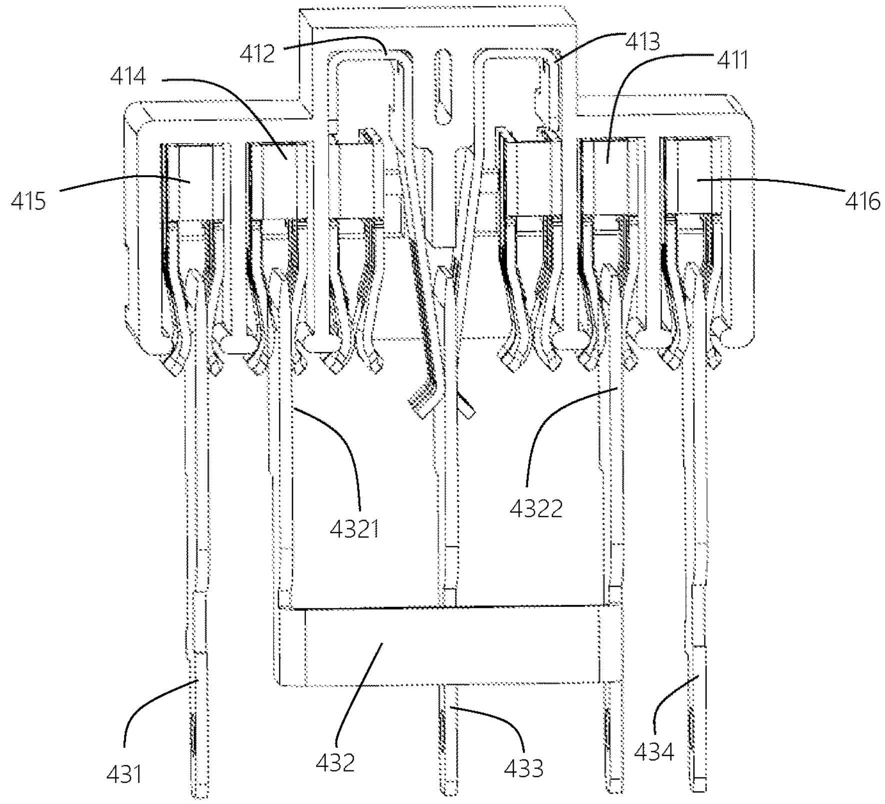
FIG. 20 is a partial perspective view of a power tool system according to the fourth embodiment of the present invention, showing the connection status of the conductive terminals of the battery pack and a second male plug of the low rated-voltage power tool when the battery pack outputting a low voltage for the low rated-voltage power tool, and the main housing of the second male plug is not shown.

Referring to FIG. 20, the second male plug 430 of the low rated-voltage power tool in the fourth embodiment is configured as same with that of the second male plug 320 of the low rated-voltage power tool shown in FIG. 14 in the third embodiment. When the second male plug 430 in this embodiment is assembled to the socket 410 of the battery pack 400, the contacting terminal 431 is clamped by two contacting arms of the communicating terminal 415, one contacting arm 4321 of the contacting terminal 431 is clamped by two contacting arms of the conductive terminal 414, the other contacting arm 4322 of the contacting terminal 431 is clamped by two contacting arms of the conductive terminal 413, the contacting terminal 433 is clamped by the auxiliary contacting arms of two conductive terminals 412, 413, the contacting terminal 434 is clamped by two contacting arms of the charging terminal 416. So that two conductive terminals 414, 411 are connected to each other through the contacting terminal 431, two conductive terminals 412, 413 are connected to each other through the contacting terminal 433. Therefore, two battery cell groups 402, 403 are connected with each other in parallel through four conductive terminals 414, 413, 412, 411 and the battery pack 400 output a low voltage to the low rated-voltage power tool through the socket 410 is connected to the second male plug 430. Therefore, the first and second battery cell groups 402, 403 can be switched between series connected state and parallel connected state through the battery pack 400 being selectively connected to the first male plug 420 of the high rated-voltage power tool or the second male plug 430 of the low rated-voltage power tool in the fourth embodiment. The battery pack 400 can selectively output a high or low voltage through connected to the high or low rated-voltage power tool.

In summary, the battery pack of the present invention comprises two sets of battery cells and four conductive terminals respectively connected to the two sets of battery cells, two of four conductive terminals are provided with different mechanical connected states formed therebetween. And two sets of the battery cells in the battery pack are isolated or serially connected with each other through these two conductive terminals with different polarity being disconnected or connected with each other. Two sets of the battery cells are always isolated with each other when these two conductive terminals having same polarity. A contacting terminal disposed on a male plug of a high rated-voltage power tool can change the mechanical connection state of two different polarity conductive terminals from isolated state to series connected state. An insulating rib disposed on a male plug of a low rated-voltage power tool can change the mechanical connection state of two different polarity conductive terminals from series connected state to isolated state. Two set of battery cells can be connected with each other in series or in parallel through the electrical connections formed between four conductive terminals of the battery pack and the conducting or contacting terminals of the high or low rated-voltage power tool when the high or low rated-voltage power tool connected to the battery pack. The battery pack output different voltages through switching the connection between two set of battery cells caused by the electrical connection formed between four terminals and the conducting or contacting terminals of corresponding power tool. so that the battery pack is widely used.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc., do not preclude a plurality. Reference signs in the claims are provided merely as a clarifying example and shall not be construed as limiting the scope of the claims in any way.

We claim:

1. A power tool system comprising:

a high rated-voltage power tool having a first male plug;

a low rated-voltage power tool having a second male plug; and a battery pack capable of outputting at least two voltages, the battery pack including:

a first battery cell group having a positive terminal and a negative terminal, a second battery cell group having a positive terminal and a negative terminal, and four electrically conductive terminals connected to the positive terminal and the negative terminal of the first battery cell group and the positive terminal and the negative terminal of the second battery cell group, and the four electrically conductive terminals comprise two adjacent variable terminals;

the two adjacent variable terminals are connected to the battery cell group terminals of different polarity, and the two adjacent variable terminals are separate from each other;

wherein when the high rated-voltage power tool is connected to the battery pack, the first male plug includes a single contact terminal that connects the two adjacent variable terminals together via the single contact terminal to enable the first battery cell group and the second battery cell group to be connected with each other in series and the battery pack to output a high voltage, and wherein when the low rated-voltage power tool is connected to the battery pack, the second male plug includes two contact terminals and an insulating rib disposed between the two contact terminals that disconnects the two adjacent variable terminals via the two contact terminals and the insulating rib to enable the first battery cell group and the second battery cell group to be connected with each other in parallel and the battery pack to output a low voltage, wherein the two contact terminals of the second male plug each define a pair of contacting arms branched at the end thereof, wherein one contacting arm of each contact terminal connects to a variable terminal and another contacting arm connects to a conductive terminal of the same polarity as the variable terminal, and wherein the insulating rib has a length longer than a length of contacting arms of the two contact terminals and is positioned between the two contact terminals to prevent circuit shorting while the two contact terminals connect like-polarity conductive terminals.

2. A power tool system comprising:

a high rated-voltage power tool having a first male plug;

a low rated-voltage power tool having a second male plug; and a battery pack capable of outputting at least two voltages, the battery pack including:

a first battery cell group having a positive terminal and a negative terminal, a second battery cell group having a positive terminal and a negative terminal, and four electrically conductive terminals connected to the positive terminal and the negative terminal of the first battery cell group and the positive terminal and the negative terminal of the second battery cell group, and the four electrically conductive terminals comprise two adjacent variable terminals;

the two adjacent variable terminals are connected to the battery cell group terminals of the same polarity, and the two adjacent variable terminals are separate from each other;

wherein when the high rated-voltage power tool is connected to the battery pack, the first male plug includes two contact terminals that disconnects the two adjacent variable terminals via the two contact terminals to enable the first battery cell group and the second battery cell group to be connected with each other in series and the battery pack to output a high voltage, and wherein when the low rated-voltage power tool is connected to the battery pack, the second male plug includes two contact terminals that connect the two adjacent variable terminals via the single contact terminal to enable the first battery cell group and the second battery cell group to be connected with each other in parallel and the battery pack to output a low voltage, and wherein the two contact terminals of the second male plug each define a pair of contacting arms branched at the end thereof, wherein one contacting arm of each contact terminal connects to a variable terminal and another contacting arm connects to a conductive terminal of the same polarity as the variable terminal.

* * * * *